United States Patent
Meyer et al.

(10) Patent No.: US 12,516,152 B2
(45) Date of Patent: Jan. 6, 2026

(54) POLYESTER CARBONATES HAVING A DEFINED PROPORTION OF ESTER GROUPS

(71) Applicant: Covestro Deutschland AG, Leverkusen (DE)

(72) Inventors: Alexander Meyer, Düsseldorf (DE); Lukas Fabian Schulz, Lemgo (DE); Thomas Pfingst, Tönisvorst (DE)

(73) Assignee: Covestro Deutschland AG, Leverkusen (DE)

( * ) Notice: Subject to any disclaimer, the term of this patent is extended or adjusted under 35 U.S.C. 154(b) by 568 days.

(21) Appl. No.: 17/919,120

(22) PCT Filed: Jun. 11, 2021

(86) PCT No.: PCT/EP2021/065740
§ 371 (c)(1),
(2) Date: Oct. 14, 2022

(87) PCT Pub. No.: WO2021/254891
PCT Pub. Date: Dec. 23, 2021

(65) Prior Publication Data
US 2023/0167235 A1    Jun. 1, 2023

(30) Foreign Application Priority Data

Jun. 19, 2020 (EP) .................................... 20181057

(51) Int. Cl.
*C08G 63/64* (2006.01)

(52) U.S. Cl.
CPC .................................... *C08G 63/64* (2013.01)

(58) Field of Classification Search
CPC .... C08G 63/181; C08G 63/199; C08G 63/64; C08G 63/672; C08G 64/06; C08G 64/305
See application file for complete search history.

(56) References Cited

U.S. PATENT DOCUMENTS

| | | | |
|---|---|---|---|
| 6,232,429 B1 | 5/2001 | Banach et al. | |
| 2017/0369641 A1* | 12/2017 | Oh | C08G 63/64 |
| 2018/0186927 A1* | 7/2018 | Shirahama | C08K 3/40 |
| 2019/0375890 A1 | 12/2019 | Jacquel et al. | |
| 2022/0073737 A1* | 3/2022 | Meyer | C08G 64/305 |

FOREIGN PATENT DOCUMENTS

| | | | | |
|---|---|---|---|---|
| CN | 105392818 A | | 3/2016 | |
| CN | 110183633 A | * | 8/2019 | C08G 63/64 |
| EP | 3026074 A1 | | 6/2016 | |
| EP | 3248999 A1 | | 11/2017 | |
| WO | 0132742 A1 | | 5/2001 | |
| WO | 2018178362 A1 | | 10/2018 | |
| WO | 2020085686 A1 | | 4/2020 | |
| WO | WO-2020126806 A1 | * | 6/2020 | C08G 63/199 |

* cited by examiner

*Primary Examiner* — James C Goloboy
(74) *Attorney, Agent, or Firm* — The Webb Law Firm

(57) ABSTRACT

The present invention relates to a process for preparing a polyester carbonate on the basis of diacids and at least one 1,4:3,6-dianhydrohexitol and at least one additional cycloaliphatic dihydroxy compound, to a polyester carbonate and to a molding compound and a molding body containing the polyester carbonate. The polyester carbonates according to the invention are characterized by a high proportion of bio-based structural motifs and good mechanical properties and molecular weights.

15 Claims, No Drawings

POLYESTER CARBONATES HAVING A DEFINED PROPORTION OF ESTER GROUPS

CROSS-REFERENCE TO RELATED APPLICATIONS

This application is the United States national phase of International Application No. PCT/EP2021/065740 filed Jun. 11, 2021, and claims priority to European Patent Application No. 20181057.9 filed Jun. 19, 2020, the disclosures of which are hereby incorporated by reference in their entirety.

BACKGROUND OF THE INVENTION

Field of the Invention

The present invention relates to copolyestercarbonates of structural formula (1) having a defined proportion of ester groups, to a molding compound, to a molded article and to a process for preparing the corresponding polyestercarbonates.

Description of Related Art

Polyesters, polycarbonates and polyestercarbonates are known to have good properties in terms of mechanical properties, heat distortion stability and weathering resistance. Depending on the monomers used, each polymer group has certain key features that characterize such materials. For instance, polycarbonates in particular have good mechanical properties, while polyesters often display better chemical stability. Depending on the monomers selected, polyestercarbonates display property profiles from both of the mentioned groups.

The disadvantage with aliphatic polycarbonates or polyestercarbonates is often their low glass transition temperature. It is accordingly advantageous to use cycloaliphatic alcohols as (co)monomers. Examples of such cycloaliphatic alcohols include TCD alcohol (tricyclodecanedimethanol; 8-(hydroxymethyl)-3-tricyclo[5.2.1.02,6]decanyl]methanol), cyclohexanediol, cyclohexanedimethanol and bio-based diols based on 1,4:3,6-dianhydrohexitols such as isosorbide and the isomers isomannide and isoidide. To raise the glass transition temperature further, cycloaliphatic acids such as 1,2-, 1,3- or 1,4-cyclohexanedicarboxylic acids or corresponding naphthalene derivatives will frequently also be used as (co)monomers. Depending on the choice of reactants, polyesters or polyestercarbonates are then obtained. This application relates to copolyestercarbonates based on 1,4:3,6-dianhydrohexitols such as isosorbide and isomers, furandicarboxylic acids and also cycloaliphatic alcohols comprising a certain amount of ester groups in order to attain improved properties. The invention further relates to a process for preparing these copolyestercarbonates which features the direct reaction of the raw materials and does not require any raw materials that are challenging to handle, such as phosgene.

Polyesters are prepared industrially, for example, by transesterification of corresponding ester-containing monomers with diols. For instance, the polyester of 1,4-cyclohexanedimethanol and 1,4-cyclohexanedicarboxylic acid is produced starting from the dimethyl ester of the diacid (blend of this polyester and polycarbonate: Xyrex® from DuPont).

For the transesterification reaction, however, phenyl esters are much more reactive than their aliphatic analogs. EP 3026074 A1 and EP 3248999 A1 describe processes for preparing polyestercarbonates with phenyl esters as intermediate step. These are prepared on the basis of cyclohexanedicarboxylic acid and isosorbide.

As the need for sustainable materials that retain the desired performance continues to grow, bio-based monomers are increasingly coming under the spotlight for copolyestercarbonates as well. In particular, the 1,4:3,6-dianhydrohexitols already mentioned above are already commercially available. Furandicarboxylic acid can also be obtained from 5-hydroxymethylfurfural, which in turn is produced from fructose.

For the purposes of the present invention, the expression "biobased" is understood as meaning that the chemical compound in question is at the filing date available and/or obtainable via a renewable and/or sustainable raw material and/or preferably is such a renewable and/or sustainable raw material. A renewable and/or sustainable raw material is preferably understood as meaning a raw material that is regenerated by natural processes at a rate that is comparable to its rate of depletion (see CEN/TS 16295:2012). The expression is used in particular for the purposes of differentiation from raw materials produced from fossil raw materials, also referred to in accordance with the invention as petroleum-based. Whether a raw material is bio-based or petroleum-based can be determined by the measurement of carbon isotopes in the raw material, since the relative amounts of the carbon isotope C14 are lower in fossil raw materials. This can be done, for example, in accordance with ASTM D6866-18 (2018) or ISO16620-1 to -5 (2015) or DIN SPEC 91236 2011-07.

Terzopoulou et al. (Materials 2017, 10, 801) describe bio-based polyesters containing furandicarboxylic acid, such as for example: poly(2-methyl-1,3-propyl-2,5-furanoate), poly(isosorbide-2,5-furanoate) and poly(1,4-cyclohexanedimethylene-2,5-furanoate). Poly(1,4-cyclohexanedimethylene-2,5-furanoate) is a semicrystalline material. However, polymers having an amorphous character are desirable since they feature in particular good transparency and good mechanical properties. Although poly(2-methyl-1,3-propyl-2,5-furanoate) is amorphous, its glass transition temperature of 55° C. is far too low for many technical applications. Poly(isosorbide-2,5-furanoate) is also amorphous and has a high glass transition temperature (157° C.), but is a very rigid and inflexible polymer. It is known that in the case of rigid polymer chains the viscosity rises sharply as the molecular weight increases and hence the increase in molecular weight is limited during the synthesis and higher molecular weights are difficult to produce. Moreover, the rigid nature of the monomers (and accordingly of the polymer chains) means that the mechanical properties are generally poorer. Terzopoulou et al. do not describe how amorphous polymers having a high glass transition temperature and simultaneously good mechanical properties can be obtained.

Wang et al. (European Polymer Journal 109 (2018) 379-390) also describe polyesters formed from furandicarboxylic acid and cyclohexanedimethanol. These materials also have a crystalline character. US2019/375890 A1 also describes polyesters comprising isosorbide, furandicarboxylic acid and cyclohexanedimethanol.

CN 110 183 633 A discloses a polyestercarbonate which comprises isosorbide, furandicarboxylic acid and a linear diol.

Liu et al. (ACS Sustainable Chem. Eng. 2019, 7, 6401-6411) describe the conflict of objectives between high glass transition temperature and flexibility of polyesters. Rigid units such as rigid rings in the polymer chain increase the glass transition temperature, whereas the incorporation of flexible units—such as for example cyclohexanedimethanol—contributes to achieving high molecular weights. The authors describe optimized polyesters formed from rigid units such as furandicarboxylic acid and tetramethylcyclobutanediol and flexible diols such as cyclohexanedimethanol. This strategy makes it possible to achieve relatively high molecular weights, but only moderate glass transition temperatures of approx. 100° C. The authors reveal no teaching as regards how to obtain materials having relatively high glass transition temperatures while simultaneously maintaining chain growth during the preparation and amorphous character.

US 2019/0375890 A1 also describes polyesters formed from furandicarboxylic acid, isosorbide, cyclohexanedimethanol and ethylene glycol. Although these polyesters have an amorphous character, the glass transition temperature remains below 100° C. for all of the configurations shown.

Example 6 of WO2020/085686 A1 discloses a polyestercarbonate which is prepared from 0.7 mol % of isosorbide, 0.3 mol % of cyclohexanedimethanol, 0.2 mol % of diphenyl ester of cyclohexanedicarboxylic acid, 0.2 mol % of diphenyl ester of terephthalic acid, 0.2 mol % of diphenyl ester of furandicarboxylic acid and 0.4 mol % of diphenyl carbonate. A total of 0.6 mol % of diphenyl esters of acids are therefore used, which, assuming complete conversion, results in 37.5 mol % of these acids in relation to the structural motifs of isosorbide, cyclohexanedimethanol and all acids in the resulting polyestercarbonate. Neither the terephthalic acid nor the cyclohexanedicarboxylic acid are bio-based, meaning that optimization of the overall proportion of bio-based starting materials in this disclosed polymer is possible.

WO 01/32742 A1, for example, describes the simple preparation of aromatic polyestercarbonates. This document reveals a direct synthesis or one-pot synthesis, that is to say a synthesis in which all of the structural motifs that form the subsequent polyestercarbonate are already present as monomers at the start of the synthesis. The monomers used here are aromatic dihydroxy compounds such as, for example, bisphenol A, carboxylic diesters and aromatic or linear aliphatic diacids. As a result of the fact that exclusively aromatic polyestercarbonates are prepared in this document, temperatures of 300° C. may be employed in the condensation reaction with removal of the phenol formed. The use of such temperatures is not possible in the preparation of polyestercarbonates with 1,4:3,6-dianhydrohexitols since under such temperature stress aliphatic diols undergo elimination and/or tend toward thermal decomposition. However, at the same time the high temperature is necessary in order to build up the desired high molecular weights. The differing reactivity of aliphatic and aromatic diols becomes particularly clear here. It is known for example from the literature that isosorbide is rarely incorporated completely into a polymer, and instead that up to 25% of the isosorbide is lost during the polymerization reaction, depending on the selected reaction conditions. It is therefore not readily possible to carry the reaction conditions for aromatic diols over to aliphatic diols. This is evident in particular from the fact that the reaction times for the polycondensation (corresponding to process step (ii)) in WO01/32742 A1 are markedly longer at elevated temperatures than those observed according to the invention.

The as-yet unpublished application PCT/EP2019/084847 discloses a one-pot synthesis of a polyestercarbonate, comprising a cycloaliphatic dicarboxylic acid, a diaryl carbonate and an aliphatic dihydroxy compound.

The polyestercarbonates described in EP 3026074 A1 and in EP 3248999 A1 have high glass transition temperatures. However, the structure of these polyestercarbonates is very rigid. This is in particular a consequence of the isosorbide structure incorporated into the polymer chain by condensation. Due to the rigid nature, the bicyclic substructure increases the glass transition temperature but makes the polymer chain highly inflexible; this can in principle lead to disadvantages. Park et al. describe that higher amounts of isosorbide in the polymer lead to a reduction in the molecular weight (S. A. Park et al. *Polymer* 2017, 116, 153-159; pp. 155/156). The authors describe that an increase in the molecular weight is impeded by the high melt viscosity. If a critical molecular weight is not achieved, this may lead to inadequate mechanical properties. This is significant for inflexible polymer chains in particular. Rigid chains require a relatively high molecular weight in order to be able to become entangled. A failure to achieve this results in brittle behavior (critical entanglement molecular weight).

SUMMARY OF THE INVENTION

Proceeding from this prior art, an object of the present invention was therefore that of providing a polyestercarbonate which features a high proportion of bio-based structural motifs, is obtainable by a simple synthesis, and has an amorphous character with high glass transition temperatures and a sufficiently high molecular weight for achieving good mechanical properties. According to the invention, a "high proportion of bio-based structural motifs" is preferably understood here to mean a proportion of at least 55 mol %, particularly preferably 60 mol % and especially preferably more than 65 mol % of bio-based structural motifs, the % being based on the sum of the monomers used (excluding the monomer from which the carbonate structure results (diphenyl carbonate)). In this case, the term "simple process" is understood in particular to mean a process which is undemanding in terms of apparatus, comprises few stages, in particular purification stages, and/or is thus economically and also environmentally advantageous. In particular, the process according to the invention should not require starting materials that are challenging to handle, especially phosgene. Glass transition temperatures of greater than 100° C., particularly preferably greater than 110° C. and very particularly preferably greater than 120° C., should preferably be achieved here. The phrase "sufficiently high molecular weights" is preferably understood to mean a polymer which has a relative solution viscosity of more than 1.20, preferably 1.20 to 1.70 and more preferably 1.22 to 1.65, measured in each case in dichloromethane at a concentration of 5 g/l at 25° C. with an Ubbelohde viscometer. In addition, the polyestercarbonates according to the invention should thus have better processing properties and good, preferably improved, mechanical properties. These should result in particular from the sufficiently high molar mass. High molecular weights result for example from better surface renewal in the preparation process. Good, preferably improved, mechanical properties are preferably intended to refer to properties such as elongation at break, modulus of elasticity and/or impact strength.

At least one and preferably all of the objects mentioned above have been achieved by the present invention. It has surprisingly been found that it is possible to synthesize a polyestercarbonate from at least one furandicarboxylic diacid, at least one diaryl carbonate, at least one 1,4:3,6-dianhydrohexitol and at least one further cycloaliphatic dihydroxy compound by means of melt transesterification in a direct synthesis or one-pot synthesis in which all of the structural motifs that form the subsequent polyestercarbonate are already present as monomers at the start of the synthesis. It has been found in this case that the same synthesis conditions for terephthalic acid instead of furandicarboxylic acid did not lead to a sufficient increase in molecular weight. A process was thus discovered which made it possible to obtain a polyestercarbonate having a high proportion of bio-based structural motifs, this process being particularly simple, that is to say undemanding in terms of apparatus, requiring few stages, in particular purification stages, and hence being economically and also environmentally advantageous. Furthermore, polyestercarbonates having an amorphous character with high glass transition temperatures were thus made available. Overall, therefore, it was possible to provide polyestercarbonates the constituent structural elements of which on the one hand are responsible for a good balance between rigidity and flexibility of the polymer chains, and which on the other hand also exhibit a sufficiently high molecular weight overall, which results in correspondingly good mechanical properties such as elongation at break, modulus of elasticity and/or impact strength. In particular, a process has been discovered in which the ratio of diols (or, according to the invention, dihydroxy compounds) to acids can be adjusted freely and flexibly. This results in polyestercarbonates having freely and flexibly adjustable proportions of ester groups and carbonate groups. In this way, polyestercarbonates having selectively adjustable mechanical properties are now obtainable. Polyestercarbonates having a lower content of ester groups compared to the prior art are thus provided in particular. Reciprocally, the polyestercarbonates according to the invention accordingly have an increased proportion of carbonate groups. As a result of this ability to freely select the individual structural motifs, a polyestercarbonate was made available having a high proportion of bio-based structural motifs, an amorphous character with high glass transition temperatures and a sufficiently high molecular weight for achieving good mechanical properties. It is therefore also preferable for the polyestercarbonate according to the invention not to have any polyester blocks. According to the invention, a polyester block is in this case preferably understood to mean that there is a succession of more than 4, particularly preferably more than 5, very particularly preferably more than 10 repeating units of formula (1) that are framed by the brackets [ . . . ]$_x$. Such polyester blocks limit the above-described flexibility with respect to setting the mechanical properties, since a ratio of diacid to diol of 1:1 must always be selected here.

The invention accordingly provides a polyestercarbonate, comprising the structural formula (1)

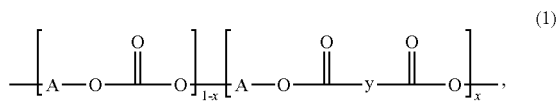

in which

A independently per repeating unit represents at least either structural unit (A) or structural unit (B), where (A) represents chemical formula (2)

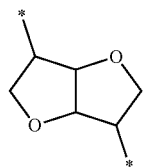

and (B) represents chemical formula (3)

where x represents a cycloalkylene group having 4 to 20, preferably 5 to 15 carbon atoms and where the polyestercarbonate always comprises the structural units (A) and (B), y each independently represents chemical formula (IV)

and

0<z<1, where the * in each case indicate the position at which the chemical formulae are incorporated into the polyestercarbonate, characterized in that the polyestercarbonate consists to an extent of 5 mol % to 30 mol %, preferably 7 mol % to 25 mol %, particularly preferably 9 mol % to 20 mol %, of the structural motif

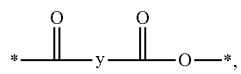

based on the total sum of the following structural motifs

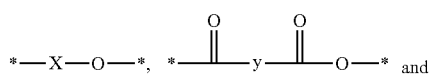

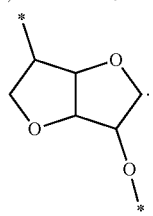

In structural formula (1), constituent "A" is defined in more detail. A may represent either at least structural unit (A) or structural unit (B). This can be freely selected independently for each repeating unit. According to the invention, the term "repeating unit" preferably refers to the structure framed either by "[ . . . ]$_{1-x}$" or by "[ . . . ]$_x$". Structural formula (1) thus already includes two different repeating units which have either a carbonate structure or an ester structure in addition to A. A, independently per repeating unit of structural formula (1), represents at least either structural unit (A) or structural unit (B). In this case, the use of the term "at least" means that A may also represent a further structural unit (C). However, the polyestercarbonate according to the invention necessarily always comprises structural units (A) and (B). Preferably, A consists only of the structural units (A) and (B) and does not include any further structural unit (C). In this case, A, independently per repeating unit of structural formula (1), represents either structural unit (A) or structural unit (B). In addition, it is apparent to a person skilled in the art that (A) may comprise two or more different structures of formula (2). Likewise, (B) may comprise two or more different structures of formula (3). However, (A) preferably comprises just one structure of formula (2). Likewise preferably, however, (B) comprises just one structure of formula (3). Particularly preferably, (A) and (B) comprise just one structure of formula (2) and (3), respectively.

According to the invention, a distinction is made between a repeating unit, a structural unit and a structural motif. Preferably, as already described above, a repeating unit is understood to mean the structure which is framed in formula (1) by the brackets [ . . . ]$_{1-z}$ or the brackets [ . . . ]$_z$. Structural formula (1) thus already includes two repeating units. As a result of A, it also additionally has at least the structural units (A) and (B). The structural units (A) and (B) (and possibly also (C)) are each present once in a repeating unit. They can be different for each repeating unit. According to the invention, the term structural unit is preferably used for a structure which is not a repeating unit per se since it has neither a carbonate structure nor an ester structure. In addition, it is not a structural motif. The term is therefore used for a structure which is smaller than a repeating unit and a structural motif. According to the invention, a structural motif is preferably understood to mean a structure which can be derived from an employed monomer by reaction to form the polymer. According to the invention, a structural motif is thus understood to mean at least the following structures:

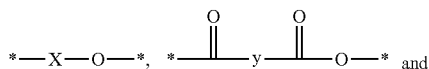 and

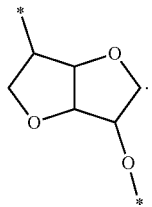

The first structural motif is derived from a diol, which is incorporated into the polymer of structural formula (1) by reaction. The oxygen is thus part of either the carbonate unit or the ester unit in structural formula (1). The second structural motif is similarly derived from a dicarboxylic acid. The third structural motif is likewise similarly derived from a 1,4:3,6-dianhydrohexitol.

In contrast to this, a structural unit according to the invention therefore does not include an oxygen and is thus not directly assignable to a monomer. Structural unit (A) thus corresponds to the structural motif

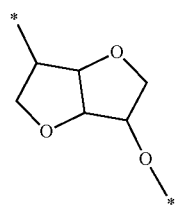

excluding the oxygen atom. Structural unit (B) corresponds to the structural motif

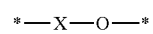

excluding the oxygen atom.

It is preferable in particular for the polyestercarbonate according to the invention to be characterized in that the polyestercarbonate comprises the following repeating units (i) to (iv) in any order

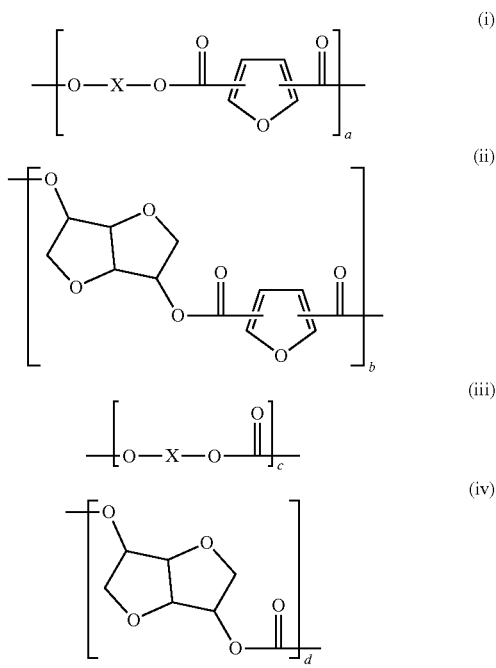

in which a, b, c and d each independently represent a natural number which indicates the average number of repeating units in each case. Here too, the repeating units are framed by brackets. The indices a, b, c and d are preferably set so as to result in the solution viscosity according to the invention. It was surprising according to the invention that the numbers a, b, c and d are so high that sufficiently high molecular weights were obtained.

The polyestercarbonate according to the invention is characterized in particular here in that a direct link between the 1,4:3,6-dianhydrohexitol and the furandicarboxylic acid is formed or can be formed in repeating unit (ii).

It is preferable according to the invention for the polyestercarbonate to consist of structural formula (1) to an extent of at least 80% by weight, preferably 85% by weight, particularly preferably 90% by weight, more preferably to 95% by weight, likewise preferably to 99% by weight, based on the total weight of the polyestercarbonate. The polyestercarbonate according to the invention therefore preferably has only small amounts of structures other than the structures defined in structural formula (1). It is furthermore preferable for the polyestercarbonate according to the invention not to comprise any functional structures other than carbonate and/or ester structures. This means that the not more than 20% by weight, preferably not more than 15% by weight, and particularly preferably not more than 10% by weight which does not consist of structural formula (1) can preferably be derived from other diols or dicarboxylic acids which in turn lead to carbonate or ester structures as a result of incorporation into the polyestercarbonate. However, the invention also covers the circumstance where the polymer molecules may each still comprise OH end groups or acid end groups. These are generally present at a low concentration according to the invention. They are therefore also included even when the polyestercarbonate according to the invention does not comprise any functional structures other than carbonate and/or ester structures.

The polyestercarbonate according to the invention is characterized in that it consists of the structural motif

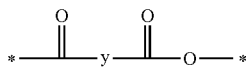

to an extent of 5 mol % to 30 mol %, preferably 7 mol % to 25 mol %, particularly preferably 10 mol % to 20 mol %, based on the total sum of the following structural motifs

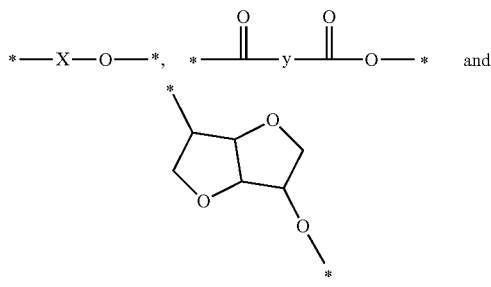

According to the invention, the ratio of the employed monomers having hydroxy functionalities to dicarboxylic acids can be freely adjusted within the mentioned ranges in the polyestercarbonate. The more dihydroxy compounds are used, the more carbonate structures result. The more dicarboxylic acid, the more ester structures. As a result, the ratio of carbonate structures to ester structures is therefore likewise freely selectable. It has been shown that this is down in particular to the process according to the invention, in which all of the monomers which form the polyestercarbonate are already present at the start of the synthesis. This therefore leads to polyestercarbonates having properties which can be adjusted in a controlled manner within the limits placed by the invention through the individual constituents of the polyestercarbonate.

Preferably, (A) is selected from at least one of the structures

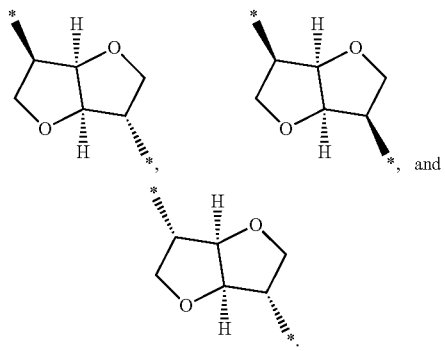

(A) is very particularly preferably

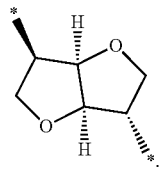

This is a structural motif that can be obtained via bio-based means. The presence of this component therefore increases the overall proportion of bio-based structural motifs in the polyestercarbonate according to the invention.

Likewise preferably, x in chemical formula (3) represents structural formula (4):

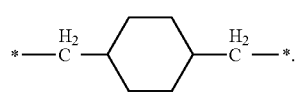

(4)

Particularly preferably, y in chemical formula (1) represents chemical formula (5):

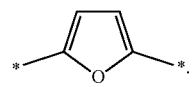

(5)

This structure is the structural motif which is derived from 2,5-furandicarboxylic acid. This can be produced by bio-based means. The presence of this component therefore increases the overall proportion of bio-based structural motifs in the polyestercarbonate according to the invention.

The polyestercarbonate according to the invention is preferably characterized in that it comprises 50 mol % to 75 mol %, preferably 53 mol % to 72 mol %, especially preferably 57 mol % to 70 mol %, of structural unit (A) and 25 mol % to 50 mol %, preferably 28 mol % to 47 mol %, especially preferably 30 mol % to 43 mol %, of structural unit (B), based in each case on the sum of structural units (A) and (B). It has been found that this ratio is particularly advantageous in terms of the mechanical properties. The structural unit (A) increases the glass transition temperature and the structural unit (B) provides flexibility to the polymer chain at the same time.

It is likewise preferable for the polyestercarbonate according to the invention to consist to an extent of 40 mol % to 70 mol %, preferably 45 mol % to 65 mol %, particularly preferably 50 mol % to 60 mol %, of chemical formula (2)

(2)

particularly preferably of chemical formula

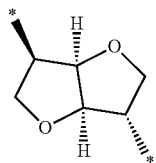

based on the total sum of the following structural motifs

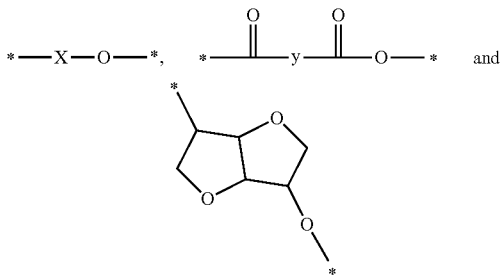

and

This high proportion of formula (2) in the polyestercarbonate according to the invention firstly increases the overall proportion of bio-based structural units. At the same time, however, this structural motif also increases the glass transition temperature. The high glass transition temperatures according to the invention can accordingly be achieved.

It is furthermore preferable for the polyestercarbonate according to the invention to consist to an extent of 20 mol % to 40 mol %, preferably 22 mol % to 38 mol %, particularly preferably 25 mol % to 35 mol %, of chemical formula (3)

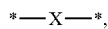

(3)

particularly preferably of chemical formula (4) based in each case on the total sum of the following structural motifs

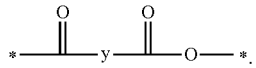

This structural motif improves the mechanical properties as a whole of the polyestercarbonate according to the invention. As shown in WO2020/085686 A1, this structural unit is likewise obtainable via bio-based means.

In addition, amounts of further acids may also be used alongside the mentioned structures for y. These are preferably bio-based. Particularly preferably, y thus additionally includes up to 60 mol %, more preferably up to 55 mol % and very particularly preferably up to 51 mol % of a structural formula y1 and/or y2, based in each case on the overall structural motif

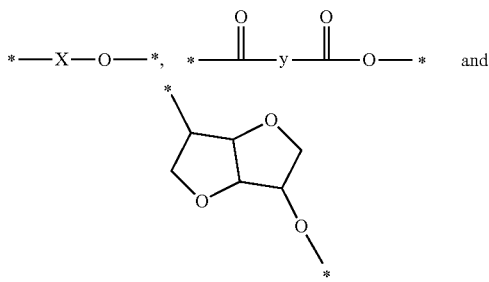

and

Preferably, y1 does not comprise a ring. Particularly preferably, y1 is selected from the group consisting of 1,4-butylene, 2,2,4-trimethylbutylene, 2,4,4-trimethylbutylene, 2,2,5-trimethylbutylene, 3,3-propylene and 3,3-dimethylpropylene. Very particularly preferably, the polyestercarbonate according to the invention thus additionally includes up to 60 mol %, more preferably up to 55 mol % and very particularly preferably up to 51 mol % of 1,4-butylene as structural formula y1 which may be selected for y, based in each case on the overall structural motif

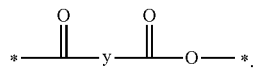

It has been found that as a result the overall proportion of bio-based structural motif can be maintained overall, and yet a higher molecular weight and hence good mechanical properties, preferably improved mechanical properties, can be achieved overall.

It is likewise possible for y2 to be selected from the group consisting of structures derived from the following dicarboxylic acids: isophthalic acid, terephthalic acid and 2,6-naphthalenedicarboxylic acid. It can be seen here that the ester group formed does not belong to the structural unit y2. Particularly preferably, however, the polyestercarbonate according to the invention does not contain any further aromatic structures derived from aromatic dicarboxylic acids. In particular, it is a disadvantage that the acids mentioned as of the filing date are not commercially available via bio-based means. In addition, it has been found that, for example, the terephthalic acid is not incorporated particularly well into the polyestercarbonate via the process according to the invention.

The polyestercarbonate according to the invention particularly preferably does not comprise any y which is derived from a petroleum-based acid. The polyestercarbonate likewise preferably does not comprise any repeating unit as a whole which is derived from a petroleum-based acid. It is particularly preferable here for the polyestercarbonate not to comprise any y representing cyclohexylene (derived from cyclohexanedicarboxylic acid). This means that it is particularly preferable for the polyestercarbonate according to the invention not to comprise any repeating units as a whole which are derived from cyclohexanedicarboxylic acid. This acid lowers the overall proportion of bio-based structural motifs in the polyestercarbonate since at the filing date it was not commercially available via bio-based means.

Furthermore, it is also not ruled out according to the invention that A additionally represents the structural unit (C). (C) comprises aliphatic and/or aromatic structures which differ from (A) and (B). However, these are preferably present only in small proportions. Preferably, (C) is additionally present to an extent of up to 20 mol %, more preferably up to 10 mol % and very particularly preferably up to 5 mol %, based on the total sum of the structural units (A), (B) and (C). The preferred defined ratio of (A) and (B) remains the same in this case. In these cases, reference is still preferably made according to the invention to an aliphatic polyestercarbonate. However, the polyestercarbonate according to the invention particularly preferably does not have any structural unit (C). Likewise, it is preferable for the polyestercarbonate according to the invention to include neither a structural unit (C) nor a structural unit y2. It is accordingly preferable for A to consist of (A) and (B).

These additional structural units (C) are preferably selected from the group consisting of the structural unit x1, which represents x in chemical formula (3), where x1 represents a linear alkylene group having 2 to 22, preferably 2 to 4 carbon atoms, which may optionally be interrupted by at least one heteroatom, or a branched alkylene group having 4 to 20, preferably 5 to 15 carbon atoms, which may optionally be interrupted by at least one heteroatom. If x1 is a linear alkylene group which may optionally be interrupted by at least one heteroatom, then this preferably has 2 to 15, particularly preferably 2 to 12, very particularly preferably 2 to 11, especially preferably 2 to 10, more preferably 2 to 6 and more preferably 3 to 4 carbon atoms. The heteroatom which may optionally interrupt the alkylene group is preferably oxygen or sulfur, particularly preferably oxygen. The alkylene group particularly preferably contains just one heteroatom or no heteroatoms. When there is at least one heteroatom present in the alkylene group, the number of carbon atoms indicated refers to the total number of carbon atoms in the alkylene group. For example, the group —CH$_2$—CH$_2$—O—CH$_2$—CH$_2$— contains 4 carbon atoms. It is preferable according to the invention for the linear alkylene group which may optionally be interrupted by at least one heteroatom to have fewer than 12, particularly preferably fewer than 10 carbon atoms. The alkylene group particularly preferably does not have any heteroatoms.

If x1 according to the invention is a branched alkylene group having 4 to 20, preferably 5 to 15 carbon atoms, particularly preferably 5 to 11 carbon atoms, very particularly preferably 5 to 10 carbon atoms, which may optionally be interrupted by at least one heteroatom, then the statements above apply to the heteroatom. The heteroatom which may optionally interrupt the branched alkylene group is preferably oxygen or sulfur, particularly preferably oxygen. The branched alkylene group particularly preferably contains just one heteroatom or no heteroatoms. The branched alkylene group particularly preferably does not have any heteroatoms. The term "branched" is understood to refer to the branches on aliphatic carbon chains as known to a person skilled in the art. This means that the branched alkylene group preferably comprises at least one tertiary and/or at least one quaternary carbon atom. More than one branch may be present in the branched alkylene group. The branches preferably have chain lengths of 1 to 5 carbon atoms, particularly preferably 1 to 4, very particularly preferably 1 to 3 carbon atoms. These carbon atoms of the branches count towards the total carbon number of the branched alkylene group. This means, for example, that a branched alkylene group —CH$_2$—C(CH$_3$)$_2$—CH$_2$— has 5 carbon atoms.

The additional structural units (C) are likewise preferably selected from the group of structural units derived from the following diols: bisphenol A, 1,1-bis(4-hydroxyphenyl)-3,3,5-trimethylcyclohexane, 4,4'-dihydroxydiphenyl (DOD), 4,4'-dihydroxydiphenyl ether (DOD ether), bisphenol B, bisphenol M, bisphenols (I) to (III)

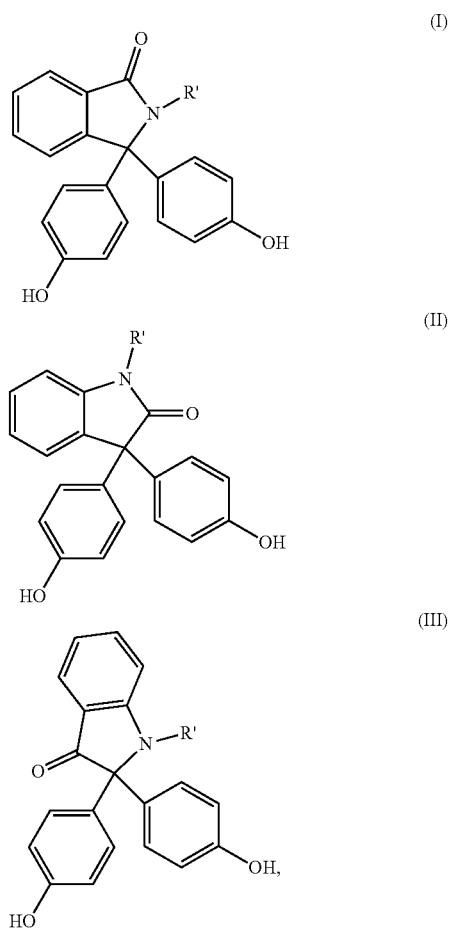

where in these formulae (I) to (III) R' in each case represents C1-C4 alkyl, aralkyl or aryl, preferably methyl or phenyl, very particularly preferably methyl. According to the invention, the expression "derived from" preferably means that the corresponding monomer is introduced into the formed polyestercarbonate via the hydroxyl group or else acid group, either by formation of an ester group or by formation of a carbonate group.

According to the invention, it is preferable, when further units are present for structural formula (1) or in structural formula (1), for the mol % and ratios defined above to be retained. The molar amount of the respective newly defined unit is then included therein.

It is likewise preferable for the defined mol % in the polyestercarbonate according to the invention to be determined by $^1$H NMR. This method is known to a person skilled in the art. The polyestercarbonate may for example be dissolved in CDCl₃ and the corresponding peaks of the structural units identified. The ratios and proportions can be determined via the integrals. On the other hand, the mol % according to the invention may also be determined via the employed molar amounts and ratios of the monomers. It has to be assumed in this case that all monomers are fully incorporated into the polyestercarbonate in the same ratio. A person skilled in the art may thus also set the ratio in advance.

The polyestercarbonate according to the invention preferably has a relative solution viscosity of 1.20 to 1.70, more preferably 1.22 to 1.65, measured in each case in dichloromethane at a concentration of 5 g/l at 25° C. with an Ubbelohde viscometer. A person skilled in the art is familiar with the determination of the relative solution viscosity by means of an Ubbelohde viscometer. According to the invention, this is preferably carried out in accordance with DIN 51562-3; 1985-05. This method involves measuring the flow times of the polyestercarbonate to be measured through the Ubbelohde viscometer in order to then ascertain the difference in viscosity between the polymer solution and its solvent. For this purpose, the Ubbelohde viscometer is first calibrated by measuring the pure solvents dichloromethane, trichloroethylene and tetrachloroethylene (always performing at least 3 measurements, but at most 9 measurements). This is followed by the calibration proper using the solvent dichloromethane. The polymer sample is then weighed out, dissolved in dichloromethane and then the flow time is determined three times for this solution. The mean value for the flow times is corrected via the Hagenbach correction and the relative solution viscosity calculated.

In a further aspect of the present invention, a process for preparing a polyestercarbonate, in particular the polyestercarbonate according to the invention, by means of melt transesterification is provided, comprising the steps of
(i) reaction at least of at least one dicarboxylic acid of formula (IVa)

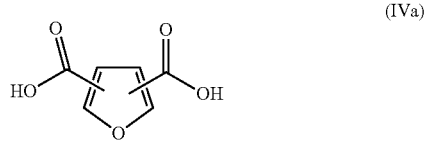

(IVa)

with at least one diaryl carbonate using at least one catalyst and in the presence of a mixture of dihydroxy compounds, comprising (A) at least one 1,4:3,6-dianhydrohexitol and (B) at least one further cycloaliphatic dihydroxy compound, and
(ii) further condensation of the mixture obtained from process step (i), at least with removal of the chemical compound eliminated in the condensation.

According to the invention, in process step (i) there is at least the reaction of at least the dicarboxylic acid of formula (IVa) with at least one diaryl carbonate. However, further reactions cannot be ruled out according to the invention as a result of the presence of the at least one 1,4:3,6-dianhydrohexitol (hereinafter also component (A)) and the at least one further aliphatic dihydroxy compound (hereinafter also component (B)) (it should be noted here that component (A) and component (B) subsequently lead to the structural units (A) and (B) in the polyestercarbonate according to the invention). In fact, examples have demonstrated that oligomers form as early as in process step (i), these oligomers having a mass spacing in a MALDI-ToF mass spectrometer which corresponds to a unit formed from component (A) and/or component (B) with carbonate (with loss of the two hydroxy groups). This means that in process step (i) further reactions may take place in addition to the formation of the diester. However, in accordance with the invention this also means that the reaction of all dicarboxylic acid of formula (IVa) present with the stoichiometric equivalent of diaryl carbonates does not need to have taken place to completion before process step (ii) is initiated. However, preference according to the invention is given to conducting process step (i) until a substantial abatement in gas formation can be observed and only then initiating process step (ii), for example by applying a vacuum to remove the chemical compound eliminated during the condensation. As has already been stated above, however, it is optionally possible for process steps (i) and (ii) to not be clearly demarcated from one another according to the invention.

Process Step (i)

The process according to the invention is referred to as a direct synthesis or else one-pot synthesis, since in process step (i) all of the structural motifs that form the subsequent polyestercarbonate are already present as monomers. This preferably means that, according to the invention, all cycloaliphatic dihydroxy compounds (in each case component (A) and (B)), all dicarboxylic acids of formula (IVa) and also all diaryl carbonates are present in this step, even when more than just the cycloaliphatic dihydroxy compounds of components (A) and (B), a dicarboxylic acid of formula (IVa) and/or a diaryl carbonate are involved. It is therefore preferable according to the invention for all monomers which undergo condensation in process step (ii) to give the polyestercarbonate to already be present during process step (i). The invention can also include the embodiment in which a small proportion of the at least one diaryl carbonate is additionally added in process step (ii). This may be used selectively in order to reduce the OH end group content of the resulting polyestercarbonate. Such an approach is described for example in JP2010077398 A. In this case, however, in order that it is still the case that all structural elements that form the subsequent polyestercarbonate are present as monomers in process step (i) and no further structural elements are added, it is necessary for the at least one diaryl carbonate that is added in small amounts in process step (ii) to correspond to the at least one diaryl carbonate present in process step (i). The process can in this sense therefore still be referred to as a direct synthesis or one-pot synthesis.

Furthermore, the presence in process step (i) of further aliphatic or aromatic dihydroxy compounds and/or dicarboxylic acids is not ruled out according to the invention. These further aliphatic or aromatic dihydroxy compounds are, however, preferably present only in small proportions. It is particularly preferable in process step (i) for additionally up to 20 mol %, more preferably up to 10 mol % and very particularly preferably up to 5 mol % of an aromatic dihydroxy compound (component (C)) to be present, based on the total molar amount of the dihydroxy compound used. The preferably defined ratio of components (A) and (B) remains the same in this case. It is likewise particularly preferable in process step (i) for additionally up to 60 mol %, more preferably up to 55 mol % and very particularly preferably up to 51 mol % of a further dicarboxylic acid, particularly preferably adipic acid, to be present, possibly also in addition to the aromatic dihydroxy compound, based on the total molar amount of the dicarboxylic acid used. However, it is particularly preferable for no further aliphatic or aromatic dihydroxy compound to be used in process step (i). It is likewise preferable for no further dicarboxylic acid to be used in process step (i). Equally, it is preferable for neither a further aliphatic or aromatic dihydroxy compound nor a further dicarboxylic acid to be used in process step (i). This makes the process easier to manage overall since fewer monomers and hence fewer influencing parameters are involved. In another embodiment, preference is given to also using adipic acid in process step (i). This is preferably used to an extent of up to 60 mol %, more preferably up to 55 mol % and very particularly preferably up to 51 mol %, based on the total molar amount of the dicarboxylic acids used. Thus, preferably only bio-based dicarboxylic acids are used in process step (i).

These additional further aliphatic dihydroxy compounds (component (C)) preferably have chemical formula (I):

(I)

in which X represents a linear alkylene group having 2 to 22, preferably 2 to 15 carbon atoms, particularly preferably 2 to 10 carbon atoms, which may optionally be interrupted by at least one heteroatom, or a branched alkylene group having 4 to 20, preferably 5 to 15 carbon atoms, which may optionally be interrupted by at least one heteroatom.

If X according to the invention is a linear alkylene group which may optionally be interrupted by at least one heteroatom, then this preferably has 2 to 15, particularly preferably 2 to 12, very particularly preferably 2 to 11, especially preferably 2 to 10, more preferably 2 to 6 and more preferably 3 to 4 carbon atoms. The heteroatom which may optionally interrupt the alkylene group is preferably oxygen or sulfur, particularly preferably oxygen. The alkylene group particularly preferably contains just one heteroatom or no heteroatoms. When there is at least one heteroatom present in the alkylene group, the number of carbon atoms indicated refers to the total number of carbon atoms in the alkylene group. For example, the group —CH$_2$—CH$_2$—O—CH$_2$—CH$_2$— contains 4 carbon atoms. It is preferable according to the invention for the linear alkylene group which may optionally be interrupted by at least one heteroatom to have fewer than 12, particularly preferably fewer than 10 carbon atoms. The alkylene group particularly preferably does not have any heteroatoms.

If X according to the invention is a branched alkylene group having 4 to 20, preferably 5 to 15 carbon atoms, particularly preferably 5 to 11 carbon atoms, very particularly preferably 5 to 10 carbon atoms, which may optionally be interrupted by at least one heteroatom, then the statements above apply to the heteroatom. The heteroatom which may optionally interrupt the branched alkylene group is preferably oxygen or sulfur, particularly preferably oxygen. The branched alkylene group particularly preferably contains just one heteroatom or no heteroatoms. The branched alkylene group particularly preferably does not have any heteroatoms. The term "branched" is understood to refer to the branches on aliphatic carbon chains as known to a person skilled in the art. This means that the branched alkylene group preferably comprises at least one tertiary and/or at least one quaternary carbon atom. More than one branch may be present in the branched alkylene group. The branches preferably have chain lengths of 1 to 5 carbon atoms, particularly preferably 1 to 4, very particularly preferably 1 to 3 carbon atoms. These carbon atoms of the branches count towards the total carbon number of the branched alkylene group. This means, for example, that a branched alkylene group —CH$_2$—C(CH$_3$)$_2$—CH$_2$— has 5 carbon atoms.

According to the invention, at least one further aliphatic and/or aromatic dihydroxy compound is preferably used.

The aromatic dihydroxy compounds (component (C)) are preferably selected from the group consisting of bisphenol A, 1,1-bis(4-hydroxyphenyl)-3,3,5-trimethylcyclohexane, 4,4'-dihydroxydiphenyl (DOD), 4,4'-dihydroxydiphenyl ether (DOD ether), bisphenol B, bisphenol M, bisphenols (I) to (III)

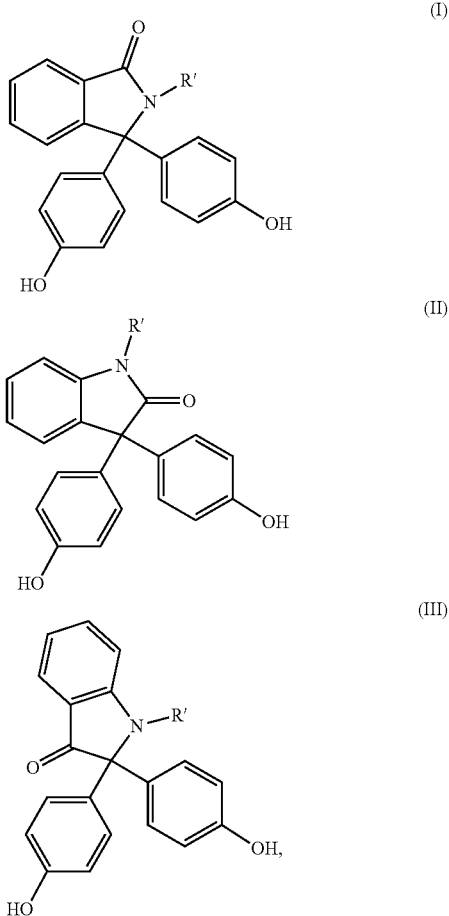

where in these formulae (I) to (III) R' in each case represents C1-C4 alkyl, aralkyl or aryl, preferably methyl or phenyl, very particularly preferably methyl.

These additional dicarboxylic acids are preferably selected from the group consisting of 2,2,4-trimethyladipic acid, 2,4,4-trimethyladipic acid, 2,2,5-trimethyladipic acid, 3,3-dimethylglutaric acid, isophthalic acid, terephthalic acid, and 2,6-naphthalenedicarboxylic acid. The at least one additional dicarboxylic acid is particularly preferably selected from the group consisting of 2,2,4-trimethyladipic acid, 2,4,4-trimethyladipic acid, 2,2,5-trimethyladipic acid and 3,3-dimethylglutaric acid. The one further dicarboxylic acid is very particularly preferably adipic acid.

According to the invention, at least one 1,4:3,6-dianhydrohexitol is used as component (A) in process step (i). As is known to a person skilled in the art, 1,4:3,6-dianhydrohexitols are generally selected from the group consisting of isomannide, isoidide and isosorbide. This may involve a bio-based structural element, which is accompanied by all of the advantages of a bio-based monomer and the resulting polymer (e.g. better sustainability since it can be obtained from renewable raw materials). The process according to the invention is particularly preferably characterized in that the at least one 1,4:3,6-dianhydrohexitol is isosorbide. It is preferable for component (A) to consist of isosorbide.

According to the invention, at least one further cycloaliphatic dihydroxy compound (component (B)) is used in process step (i). It is preferable for component (B) to consist of two further cycloaliphatic dihydroxy compounds. It is likewise preferable for component (B) to consist of one further cycloaliphatic dihydroxy compound. Thus, it is particularly preferable for component (A) to consist of isosorbide and for component (B) to consist of a further cycloaliphatic dihydroxy compound. A component (C) may optionally also be present in the mixture of dihydroxy compounds, (see above).

The process according to the invention is particularly preferably characterized in that the at least one cycloaliphatic dihydroxy compound (component (B)) is selected from the group consisting of 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and any desired mixtures thereof. Component (B) is very particularly preferably selected from the group consisting of 1,2-cyclohexanedimethanol, 1,3-cyclohexanedimethanol and 1,4-cyclohexanedimethanol. Component (B) is particularly preferably 1,4-cyclohexanedimethanol.

Likewise, according to the invention at least one dicarboxylic acid of formula (IVa) is used in process step (i). This is preferably 2,5-furandicarboxylic acid.

Likewise, according to the invention at least one diaryl carbonate is used in process step (i). It is preferable here for the at least one diaryl carbonate to be selected from the group consisting of a compound of formula (2)

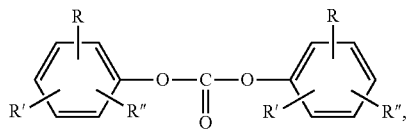

(2)

in which
R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group. Preferably, R, R' and R" are each independently identical or different and represent hydrogen, optionally branched C1-C34 alkyl, C7-C34 alkylaryl, C6-C34 aryl, a nitro group, a carbonyl-containing group or a halogen group. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl] carbonate, bis(methylsalicyl) carbonate, bis(ethylsalicyl) carbonate, bis(propylsalicyl) carbonate, bis(2-benzoylphenyl) carbonate, bis(phenylsalicyl) carbonate and/or bis(benzylsalicyl) carbonate. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, bis(2-benzoylphenyl) carbonate, bis(phenylsalicyl) carbonate and/or bis(benzylsalicyl) carbonate. The at least one diaryl carbonate is especially preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate and/or di[4-(1-methyl-1-phenylethyl)phenyl] carbonate. The at least one diaryl carbonate is particularly preferably diphenyl carbonate.

In a preferred embodiment, process step (i) employs isosorbide as component (A), 1,4-cyclohexanedimethanol as component (B), diphenyl carbonate as diaryl carbonate and 2,5-furandicarboxylic acid as dicarboxylic acid of formula (IVa). It is particularly preferable here for adipic acid to be used as further dicarboxylic acid. In this embodiment it is preferable for no further monomers to be used.

Furthermore, according to the invention at least one catalyst is present in process step (i). This is preferably an inorganic base and/or an organic catalyst. The at least one catalyst is particularly preferably an inorganic or organic base having a $pK_b$ of not more than 5.

It is also preferable for the at least one inorganic base or the at least one organic catalyst to be selected from the group consisting of the hydroxides, carbonates, halides, phenoxides, diphenoxides, fluorides, acetates, phosphates, hydrogen phosphates and boranates of lithium, sodium, potassium, cesium, calcium, barium, and magnesium, tetramethylammonium hydroxide, tetramethylammonium acetate, tetramethylammonium fluoride, tetramethylammonium tetraphenylboranate, tetraphenylphosphonium fluoride, tetraphenylphosphonium tetraphenylboranate, dimethyldiphenylammonium hydroxide, tetraethylammonium hydroxide, cetyltrimethylammonium tetraphenylboranate, cetyltrimethylammonium phenoxide, diazabicycloundecene (DBU), diazabicyclononene (DBN), 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidenedi-1,5,7-triazabicyclo[4.4.0]dec-5-ene, 7,7'-decylidenedi-1,5,7-triazabicyclo[4.4.0]dec-5-ene, 7,7'-dodecylidenedi-1,5,7-triazabicyclo[4.4.0]dec-5-ene, the phosphazene base P1-t-oct (tert-octyliminotris(dimethylamino)phosphorane), the phosphazene base P1-t-butyl (tert-butyliminotris(dimethylamino)phosphorane), and 2-tert-butylimino-2-diethylamino-1,3-dimethylperhydro-1,3,2-diaza-2-phosphorane (BEMP). It is also possible to use any desired mixtures.

The at least one catalyst is particularly preferably an organic base, preferably those mentioned above, very particularly preferably alkylamines, imidazole (derivatives), guanidine bases such as triazabicyclodecene, DMAP and corresponding derivatives, DBN and DBU, most preferably DMAP. These catalysts provide the particular advantage that they can be separated off in process step (ii) according to the invention along with the chemical compound eliminated during the condensation, for example by reduced pressure. This means that the resulting polyestercarbonate contains only a small content of catalyst, or even none at all. This provides the particular advantage that the polymer contains no inorganic salts, as for example are always formed in a route in which phosgene is used. It is known that such salts can have a negative impact on the stability of the polyestercarbonate since the ions can have a catalytic effect with corresponding degradation.

The at least one catalyst is preferably used in amounts of 1 to 5000 ppm, preferably 5 to 1000 ppm and particularly preferably 20 to 200 ppm, based on 1 mol of the cycloaliphatic dicarboxylic acid.

In another embodiment, the process according to the invention is characterized in that the reaction in process step (i) is conducted in the presence of at least a first catalyst and/or a second catalyst and the condensation in process step (ii) is conducted at least in the presence of the first catalyst and the second catalyst, wherein the first catalyst is at least one tertiary nitrogen base, the second catalyst is at least one basic compound, preferably a basic alkali metal salt, and wherein the proportion of the alkali metal cations in process step (ii) is 0.0008% to 0.0050% by weight, based on all components used in process step (i).

In this embodiment, therefore, a first catalyst and/or a second catalyst is present in process step (i).

The first catalyst is a tertiary nitrogen base. This first catalyst is preferably selected from guanidine-derived bases, 4-dimethylaminopyridine (DMAP), 1,8-diazabicyclo[5.4.0]undec-7-ene, 1,5-diazabicyclo[4.3.0]non-5-ene, 1,5,7-triazabicyclo[4.4.0]dec-5-ene, hexamethylphosphorimide triamide, 1,2-dimethyl-1,4,5,6-tetrahydropyridine, 7-methyl-1,5,7-triazabicyclodec-5-ene, 1,8-diazabicyclo[5.4.0]undec-7-ene (DBU), DBN, ethylimidazole, N,N-diisopropylethylamine (Hunig's base), pyridine, TMG, and mixtures of these substances. More preferably, the first catalyst is selected from guanidine-derived bases, 4-dimethylaminopyridine (DMAP), 1,8-diazabicyclo[5.4.0]undec-7-ene, 1,5-diazabicyclo[4.3.0]non-5-ene, and 1,5,7-triazabicyclo[4.4.0]dec-5-ene. Particular preference is given to using 4-dimethylaminopyridine.

The first catalyst is preferably used in an amount of 0.002% to 0.10% by weight, more preferably in an amount of 0.005% to 0.050% by weight, particularly preferably in an amount of 0.008% to 0.030% by weight, based in each case on all components used in process step (i).

It is preferable for the second catalyst to be selected from the group consisting of inorganic or organic alkali metal salts and inorganic or organic alkaline earth metal salts. More preferably, the alkali metal cations present in process step (ii) are lithium cations, potassium cations, sodium cations, cesium cations and mixtures thereof.

The second catalyst used is the organic or inorganic alkali metal or alkaline earth metal salt preferably of a weak acid (pKa of between 3 and 7 at 25° C.). Suitable weak acids are for example carboxylic acids, preferably C2-C22 carboxylic acids, such as acetic acid, propionic acid, oleic acid, stearic acid, lauric acid, benzoic acid, 4-methoxybenzoic acid, 3-methylbenzoic acid, 4-tert-butylbenzoic acid, p-tolueneacetic acid, 4-hydroxybenzoic acid, salicylic acid, partial esters of polycarboxylic acids, such as monoesters of succinic acid, branched aliphatic carboxylic acids, such as 2,2-dimethylpropanoic acid, 2,2-dimethylpropanoic acid, 2,2-dimethylbutanoic acid, and 2-ethylhexanoic acid. However, it is also likewise possible for the organic or inorganic alkali metal or alkaline earth metal salt of a strong acid such as for example hydrochloric acid to be used.

Suitable organic and inorganic salts are or are derived from sodium hydrogen carbonate, potassium hydrogen carbonate, lithium hydrogen carbonate, sodium carbonate, lithium carbonate, potassium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, and the disodium, dipotassium and dilithium salts of BPA. It is also possible to use calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and corresponding oleates. Corresponding salts of phenols, in particular of phenol, may also be used. These salts may be used individually or in a mixture.

The second catalyst is preferably selected from the group consisting of sodium hydroxide, lithium hydroxide, sodium phenoxide, lithium phenoxide, sodium benzoate, lithium benzoate, lithium chloride, lithium acetylacetonate and cesium carbonate, and mixtures of these substances. Particular preference is given to using sodium phenoxide, lithium phenoxide, sodium hydroxide, lithium hydroxide, sodium benzoate, lithium benzoate, lithium chloride and/or lithium acetylacetonate. Lithium chloride is preferably used as an aqueous solution, for example in the form of a 15% solution.

It was found that the molar ratio of all dihydroxy compounds present in process step (i) to all dicarboxylic acids present in process step (i) prior to the reaction in process step (i) is preferably 1:0.4 to 1:0.005, more preferably 1:0.3 to 1:0.015, and very particularly preferably 1:0.2 to 1:0.05.

The process according to the invention is characterized in that carbon dioxide is released during the process. According to the invention, carbon dioxide is preferably eliminated in process step (i) (see reaction scheme above). This procedure allows a quick reaction with low thermal stress.

In addition, process step (i) of the invention preferably comprises at least one, particularly preferably all, of the following steps (ia) to (ic):

(ia) Melting of all components present in process step (i), i.e. at least the at least one dicarboxylic acid of formula (IVa), the at least one diaryl carbonate, and at least components (A) and (B) in the presence of the at least one catalyst. This is preferably done under a protective gas atmosphere, preferably under nitrogen and/or argon. Step (ia) is preferably effected in the absence of a solvent. The term "solvent" is in this context known to a person skilled in the art. According to the invention, the term "solvent" is preferably understood as meaning a compound that does not enter into a chemical reaction in either of process steps (i) and (ii). Excluded are those compounds that are formed by the reaction (for example phenol if diphenyl carbonate is used as the at least one diaryl carbonate). Of course, the presence of traces of solvents in the starting compounds cannot be ruled out. This case is preferably to be included in accordance with the invention. However, with preference according to the invention, an active step of adding such a solvent is avoided.

(ib) Heating of the mixture, preferably the melt obtained from step (ia). Step (ia) and step (ib) may also overlap, since heating may likewise be necessary to produce a melt in step (ia). The heating is preferably carried out initially to 150° C. to 180° C.

(ic) Reacting the mixture, preferably the mixture obtained from step (ib), with introduction of mixing energy, preferably by stirring. Here, too, step (ic) may overlap with step (ib), since the heating may already initiate the reaction of the mixture. The melt is here preferably already heated under standard pressure to temperatures between 150 and 180° C. as a result of step (ib). Depending on the selected catalyst, the temperature can be left within the range of 160-200° C.

Alternatively, the temperature in step (ic) is increased in steps, depending on the observed reactivity, to 200° C.-300° C., preferably 210-260° C., particularly preferably 215-240° C. The reactivity can be estimated from the evolution of gas, in a manner known to a person skilled in the art. Although higher temperatures are in principle also possible in this step, side reactions (e.g. discoloration) can occur at higher temperatures. Higher temperatures are therefore less preferable. The mixture is stirred under standard pressure until the evolution of gas has largely ceased. It is in accordance with the invention possible that under these conditions the aryl alcohol formed by the reaction of the at least one carboxylic acid with the at least one diaryl carbonate (for example phenol when using diphenyl carbonate) will already also be partly removed.

According to the invention, it was also observed that at least one of the dihydroxy compounds (A) and/or (B) had likewise already begun to react by this time. For instance, it was possible to detect oligomers comprising carbonate units from the reaction of the at least one of the dihydroxy compounds (A) and/or (B) with the at least one diaryl carbonate and/or ester units from the reaction of the at least one of the dihydroxy compounds (A) and/or (B) with the at least one dicarboxylic acid.

It is therefore preferable according to the invention for the mixture obtained from process step (i), prior to the performance of process step (ii), to include oligomers comprising carbonate units from the reaction of at least one of the dihydroxy compounds (component (A) and/or (B)) with the at least one diaryl carbonate and/or ester units from the reaction of at least one of the dihydroxy compounds (component (A) and/or (B)).

The reaction time in step (ic) depends on the amount of the starting materials. Preferably, the reaction time in step (ic) is between 0.5 h to 24 h, preferably between 0.75 h and 5 h, and particularly preferably between 1 h and 3 h. It is preferable here to select the reaction time such that the evolution of gas has largely subsided (see reaction scheme above).

According to the invention, it is preferable for the molar ratio of the sum of all dihydroxy compounds present in process step (i) and all dicarboxylic acids present in process step (i) to all diaryl carbonates present in process step (i) prior to the reaction in process step (i) to be 1:0.4 to 1:1.6, preferably 1:0.5 to 1:1.5, further preferably 1:0.6 to 1:1.4, particularly preferably 1:0.7 to 1:1.3, especially preferably 1:0.8 to 1:1.2, and very particularly preferably 1:0.9 to 1:1.1. A person skilled in the art is capable of selecting corresponding optimally suitable ratios according to the purity of the starting substances.

Process Step (ii)

In process step (ii), the mixture obtained from process step (i) undergoes further condensation, at least with removal of the chemical compound eliminated in the condensation. In accordance with the invention, the expression "further" condensation is to be understood as meaning that at least some condensation has already taken place in process step (i). This is preferably the reaction of the at least one cycloaliphatic dicarboxylic acid with the at least one diaryl carbonate with the elimination of an aryl alcohol. Preferably, however, further condensation to form oligomers has also already taken place (see in this respect process step (i)).

If, in process step (i), only the first catalyst or only the second catalyst has been used, then the catalyst not used in process step (i) is added in process step (ii).

The proportion of alkali metal cations in process step (ii) is preferably 0.0009% to 0.0005% by weight and particularly preferably 0.0010% to 0.0045% by weight, based in each case on all components used in process step (i).

In a preferred embodiment, the first catalyst and the second catalyst are present in process step (i).

It is also possible to use a portion of the first catalyst and/or a portion of the second catalyst in process step (i) and to then use the respective remainder in process step (ii).

However, preference is given to using the entire amount of the first and/or of the second catalyst in process step (i). Most preferably, the entire amount of both catalysts is used in process step (i).

The term "condensation" is known to a person skilled in the art. This is preferably understood as meaning a reaction in which two molecules (of the same substance or different substances) combine to form a larger molecule, with a molecule of a chemically simple substance being eliminated. This compound eliminated in the condensation is removed in process step (ii). It is preferable here for the chemical compound eliminated in the condensation to be removed in process step (ii) by means of reduced pressure. It is accordingly preferable for the process according to the invention to be characterized in that the volatile constituents having a boiling point below the cycloaliphatic diester formed in process step (i), below the mixture of dihydroxy compounds, and below the at least one diaryl carbonate, are removed during the reaction in process step (i), optionally accompanied by a stepwise reduction in pressure. A stepwise removal is preferably chosen when different volatile constituents are being removed. Stepwise removal is also preferably chosen in order to ensure that the volatile constituent(s) is/are removed as completely as possible. The volatile constituents are the chemical compound(s) eliminated in the condensation.

Reducing the pressure in steps can be done for example by lowering the pressure as soon as the overhead temperature falls, so as to ensure continuous removal of the chemical compound eliminated in the condensation. Once a pressure of 1 mbar, preferably <1 mbar, has been reached, the condensation is continued until the desired viscosity has been attained. This can be done for example by monitoring the torque, i.e. the polycondensation is stopped on attaining the desired stirrer torque.

The condensation product is preferably removed in process step (ii) at temperatures of 200° C. to 280° C., particularly preferably 210° C. to 260° C., and especially preferably 220° C. to 250° C. The vacuum during the removal is further preferably 500 mbar to 0.01 mbar. It is particularly preferable for removal to be effected in steps by reducing the vacuum. The vacuum in the final stage is very particularly preferably 10 mbar to 0.01 mbar.

The polyestercarbonate according to the invention can be processed as such into molded articles of all kinds. It may also be processed with other thermoplastics and/or polymer additives to give thermoplastic molding compounds. The molding compounds and molded articles are further subject matter of the present invention.

The polymer additives are preferably selected from the group consisting of flame retardants, anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, dyes and pigments, impact modifiers and also fillers and reinforcers.

The thermoplastic molding compounds may for example be prepared in a known manner by mixing the polyestercarbonate and the further constituents and melt-compounding and melt-extruding them at temperatures of preferably 200° C. to 320° C. in conventional units such as internal kneaders, extruders and twin-shaft screw systems. In the context of the present application this process is generally referred to as compounding.

The term "molding compound" is thus to be understood as meaning the product obtained when the constituents of the composition are melt-compounded and melt-extruded.

The molded articles formed from the polyestercarbonate according to the invention or from the thermoplastic molding compounds comprising the polyestercarbonate may be produced for example by injection molding, extrusion and blow-molding processes. A further form of processing is the production of molded articles by thermoforming from previously produced sheets or films.

The invention claimed is:

1. A polyestercarbonate, comprising structural formula (1)

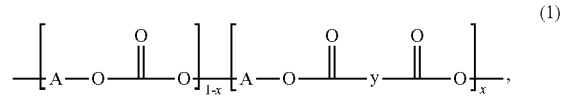
(1)

in which
A independently per repeating unit represents at least either structural unit (A) or structural unit (B), where
(A) represents chemical formula (2)

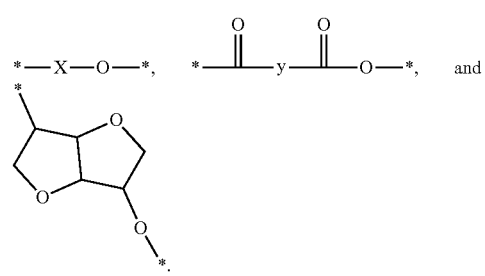

and
(B) represents chemical formula (3)

*—X—*,  (3)

where x represents a cycloalkylene group having 4 to 20 carbon atoms and where the polyestercarbonate comprises at least one structural unit (A) and at least one structural unit (B),
y each independently represents chemical formula (IV)

(IV)

and
0<z<1,
where the * in each case indicate the position at which the chemical formulae are incorporated into the polyestercarbonate, wherein the polyestercarbonate comprises 5 mol % to 30 mol % of the structural motif $$*-\overset{O}{\underset{\|}{C}}-y-\overset{O}{\underset{\|}{C}}-O-*,$$

based on the total sum of the following structural motifs $$*-X-O-*,\quad *-\overset{O}{\underset{\|}{C}}-y-\overset{O}{\underset{\|}{C}}-O-*,\quad \text{and}$$

2. The polyestercarbonate as claimed in claim 1, wherein the polyestercarbonate comprises
50 mol % to 75 mol % of structural unit (A) and
25 mol % to 50 mol % of structural unit (B),
based in each case on the sum of structural units (A) and (B).

3. The polyestercarbonate as claimed in claim 1, wherein the polyestercarbonate comprises structural formula (1) to an extent of at least 80% by weight, based on the total weight of the polyestercarbonate.

4. The polyestercarbonate as claimed in claim 1, wherein the polyestercarbonate comprises 40 mol % to 70 mol % of chemical formula (2)

(2)

based on the total sum of the following structural motifs $$*-X-O-*,\quad *-\overset{O}{\underset{\|}{C}}-y-\overset{O}{\underset{\|}{C}}-O-*,\quad \text{and}$$

5. The polyestercarbonate as claimed in claim 1, wherein the polyestercarbonate comprises the following repeating units (i) to (iv) in any order (i)

-continued (ii)
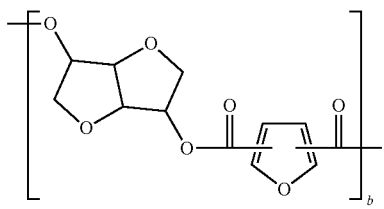

(iii)
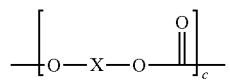

(iv)
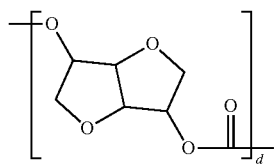

in which a, b, c and d each independently represent a natural number which indicates the average number of repeating units in each case.

6. The polyestercarbonate as claimed in claim 1, wherein the polyestercarbonate comprises 20 mol % to 40 mol % of chemical formula (3)

$$*-X-*, \quad (3)$$

based on the total sum of the following structural motifs

 and

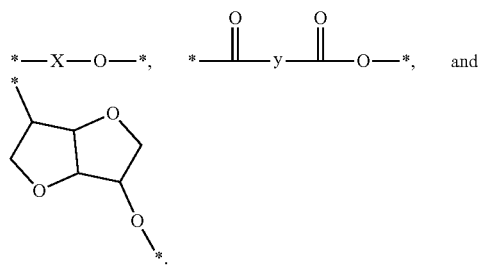

7. The polyestercarbonate as claimed in claim 1, wherein x in chemical formula (3) represents structural formula (4):

(4)

8. The polyestercarbonate as claimed in claim 1, wherein y in structural unit (1) represents chemical formula (5):

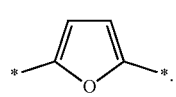
(5)

9. A process for preparing a polyestercarbonate as claimed in claim 1 by means of melt transesterification, comprising the steps of
   (i) reaction at least of at least one dicarboxylic acid of formula (IVa)

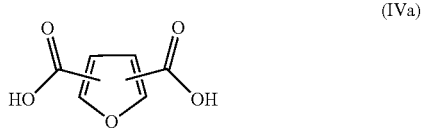
(IVa)

with at least one diaryl carbonate using at least one catalyst and in the presence of a mixture of dihydroxy compounds, comprising (A) at least one 1,4:3,6-dianhydrohexitol and (B) at least one further cycloaliphatic dihydroxy compound, and
   (ii) further condensation of the mixture obtained from process step (i), at least with removal of the chemical compound eliminated in the condensation.

10. The process for preparing a polyestercarbonate as claimed in claim 9, wherein the reaction in process step (i) is conducted in the presence of at least a first catalyst and/or a second catalyst and the condensation in process step (ii) is conducted at least in the presence of the first catalyst and the second catalyst, wherein the first catalyst is at least one tertiary nitrogen base, the second catalyst is at least one basic alkali metal salt, and wherein the proportion of the alkali metal cations in process step (ii) is 0.0008% to 0.0030% by weight, based on all components used in process step (i).

11. The process for preparing a polyestercarbonate as claimed in claim 9, wherein the at least one diaryl carbonate is selected from the group consisting of a compound of formula (6)

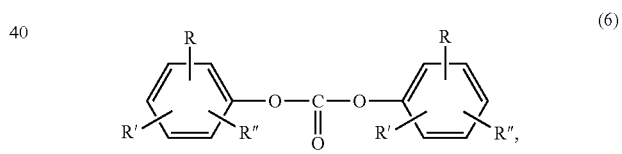
(6)

in which
R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group.

12. The process for preparing a polyestercarbonate as claimed in claim 9, wherein the at least one diaryl carbonate is diphenyl carbonate.

13. The process for preparing a polyestercarbonate as claimed in claim 9, wherein the at least one catalyst is selected from the group consisting of guanidine-derived bases, 4-dimethylaminopyridine, 1,8-diazabicyclo[5.4.0]undec-7-ene (DBU), 1,5-diazabicyclo[4.3.0]non-5-ene (DBN), 1,5,7-triazabicyclo[4.4.0]dec-5-ene, and mixtures of these substances.

14. A molding compound comprising a polyestercarbonate as claimed in claim 1.

15. A molded article comprising a polyestercarbonate as claimed in claim 1.

* * * * *